US011546328B2

(12) United States Patent
Eichelberger et al.

(10) Patent No.: US 11,546,328 B2
(45) Date of Patent: Jan. 3, 2023

(54) CONTINUOUS MULTIFACTOR DEVICE AUTHENTICATION

(71) Applicant: HEWLETT PACKARD ENTERPRISE DEVELOPMENT LP, Houston, TX (US)

(72) Inventors: Rafael Anton Eichelberger, Porto Alegre (BR); Carlos Gomez Gallego, Brisbane (AU); Sebastien Tandel, Santa Clara, CA (US); Juliano Cardoso Vacaro, Porto Alegre (BR)

(73) Assignee: Hewlett Packard Enterprise Development LP, Spring, TX (US)

( * ) Notice: Subject to any disclaimer, the term of this patent is extended or adjusted under 35 U.S.C. 154(b) by 813 days.

(21) Appl. No.: 16/255,937

(22) Filed: Jan. 24, 2019

(65) Prior Publication Data
US 2020/0244653 A1    Jul. 30, 2020

(51) Int. Cl.
H04L 29/06 (2006.01)
H04L 9/40 (2022.01)
H04L 67/12 (2022.01)

(52) U.S. Cl.
CPC ...... *H04L 63/0876* (2013.01); *H04L 63/1425* (2013.01); *H04L 67/12* (2013.01)

(58) Field of Classification Search
CPC . H04L 63/0876; H04L 63/1425; H04L 67/12; H04W 12/009; H04W 12/065
USPC .......................................................... 726/6
See application file for complete search history.

(56) References Cited

U.S. PATENT DOCUMENTS

| 9,536,072 | B2  |     | 1/2017  | Guedalia et al. |
| 10,467,402 | B2 | *   | 11/2019 | Waltermann .......... H04L 9/0866 |
| 2013/0139263 | A1 | * | 5/2013  | Beyah ................ H04L 63/1408 726/23 |
| 2015/0012752 | A1 |    | 1/2015  | Priyadarshi et al. |
| 2015/0242605 | A1 |    | 8/2015  | Du et al. |
| 2016/0155128 | A1 |    | 6/2016  | Desai et al. |
| 2020/0193006 | A1 | * | 6/2020  | Krieg .................... H04L 9/0866 |

OTHER PUBLICATIONS

Bezawada, B. et al., IoTSense: Behavioral Fingerprinting of IoT Devices, (Research Paper), Apr. 11, 2018, 11 Pgs.
Merchant, K. et al., Deep Learning for RF Device Fingerprinting in Cognitive Communication Networks, (Web Page), Jan. 23, 2018, 3 Pgs.

* cited by examiner

*Primary Examiner* — Tu T Nguyen
(74) *Attorney, Agent, or Firm* — Nolte Lackenbach Siegel

(57) ABSTRACT

A device is authenticated for communication over a network based on a sensor data signature and a traffic pattern signature. The sensor data signature and the traffic pattern signature identify the device. A determination is made whether the sensor data signature corresponds to one of a plurality of recognized sensor data signatures. A determination is also made whether the traffic pattern signature of the device corresponds to one of a plurality of recognized traffic pattern signatures. The device is authenticated for communication over the network responsive to determining that the sensor data signature corresponds to one of the plurality of recognized sensor data signatures and the traffic pattern signature corresponds to one of the plurality of recognized traffic pattern signatures.

13 Claims, 5 Drawing Sheets

CONTINUOUS MULTIFACTOR DEVICE AUTHENTICATION

BACKGROUND

In the interest of network security, a communication network service provider typically identifies and authenticates a device before allowing the device to communicate over a network. The network service provider may also wish to verify that the user of the device is the rightful user. An authentication system is typically used to authenticate the user and/or the device.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
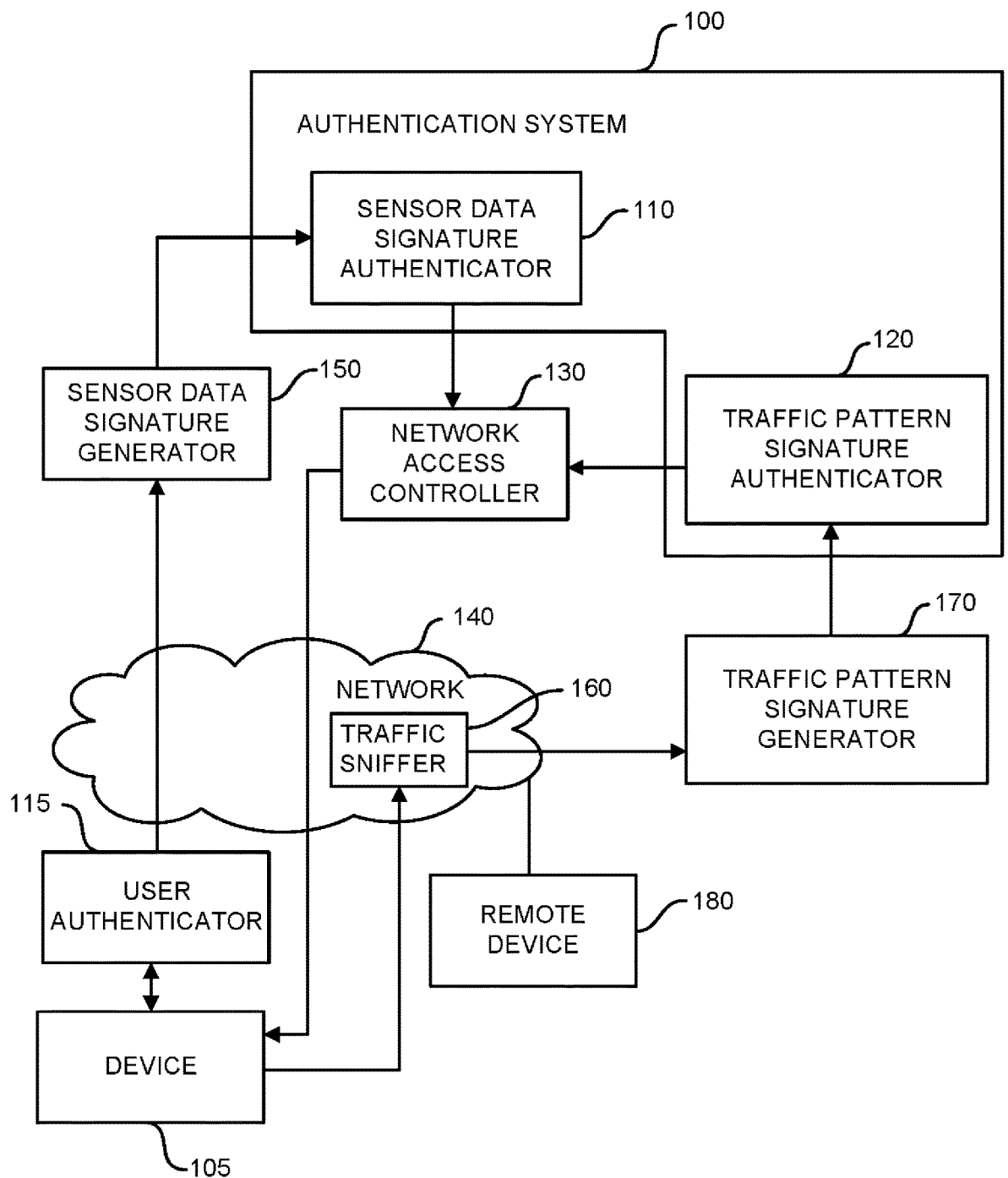
FIG. 1 conceptually illustrates an authentication system for authenticating a device for communication over a network, according to one or more examples of the disclosure.

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

A communication network (such as a public or private Ethernet network, wireless network, etc.) allows a device to communicate with other communication devices, servers, etc. A device can refer to any form of programmable communication device including, but not limited to, mobile devices (such as personal computers, tablets, smartphones, personal data assistants (PDA's), receivers within vehicles (e.g., automobiles), interactive game devices, etc.) and Internet of Things (IoT) devices (such as smart televisions, home appliances, mobile health devices, smart wearable devices, etc.). A server can refer to a computing device including a processor that performs operations to provide an application or a service.

To allow a device to communicate over the network, an authentication system identifies and authenticates the device and/or the user. An authentication system refers to a service or application provided by a server or other computing device that may request or require authentication of a communication device or a user of a device.

The massive growth in network-connected devices has increased the complexity of network design, architecture, and security. The insurance of higher security levels has become important since users often use their own devices to connect to both private and public networks. Authentication systems usually provide secure access through a password or encrypted keys which can be guessed or stolen, thus exposing the whole network to vulnerabilities. In addition, IoT devices do not provide strong authentication capabilities (if any) for connecting to communication networks.

Currently, Internet Protocol (IP) or Media Access Control (MAC) addresses are used as device identifiers to authenticate devices. However, these addresses, used as device identifiers, present several shortcomings. For example, these addresses are easy to spoof. Also, MAC addresses may be randomized so that every time a device connects to a network, a random MAC address is provided to identify the device. While randomization of MAC addresses provides privacy protection, it invalidates the usage of MAC addresses as an identifier. Further, regulations on privacy, such as the European General Data Protection Regulation, pose a risk to the usage of IP/MAC addresses as identifiers.

In accordance with illustrative examples, devices are continuously authenticated using multifactor authentication. That is, sensor data actively collected from a device and a traffic pattern passively observed from a device are used to authenticate the device.

According to illustrative examples, at least one of a sensor data signature and a traffic pattern signature are used to authenticate a device for communicating over a network. The sensor data signature is characteristic of sensor data collected from a sensor of the device and identifies the device. The traffic pattern signature is characteristic of a traffic pattern observed from the device and identifies the device. A determination is made whether the sensor data signature of the device corresponds to one of a plurality of recognized sensor data signatures that are respectively characteristic of sensor data collected from respective sensors of respective recognized devices. In addition, or as an alternative, a determination is made whether a traffic pattern signature of the device corresponds to one of a plurality of recognized traffic pattern signatures that are respectively characteristic of traffic patterns observed from respective recognized devices. The device is authenticated responsive to determining that the sensor data signature corresponds to one of the plurality of recognized sensor data signatures and/or that the traffic pattern signature of the device corresponds to one of the plurality of recognized traffic pattern signatures.

An example of an authentication system 100 for authenticating a device 105 for communicating over a network 140 is shown in FIG. 1. Although not shown in the interest of simplicity of illustration, the device 105 includes motion sensors, such as a gyroscope, an accelerometer, etc. The device 105 may also include other sensors, such as a microphone, a camera, a magnetometer, a weather sensor, a magnetometer, a Global Positioning Sensor (GPS), etc. In addition, the device 105 includes other components, such as transceivers, an oscillator, a clock, etc. Even for devices produced on the same production line, there will be micro variances between the sensors and the other components included in the devices. According to illustrative examples, signatures which identify the device relative to other devices may be generated, taking these micro variances into account. In particular, a sensor data signature and a traffic pattern signature may be generated for the device 105 to identify the device. The sensor data signature and the traffic pattern signature are used by the authentication system 100 to authenticate the device 105 for communication over the network 140. Although one device 105 to be authenticated is shown in FIG. 1, it should be appreciated that any number of devices connected to the network may be authenticated as described herein.

Referring first to the sensor data signature, the sensor data signature is generated as the user of the device 105 attempts to authenticate the device to communicate over the network 140. That is, when a user of the device 105 desires to communicate with, for example, a remote device 180 via the network 140, the user enters user credentials into the device 105 that is connected to the network 140. At this point, the device 105 only has restricted access to the network 140, e.g., for the purpose of user authentication. The user credentials are sent to a user authenticator 115. The user credentials can be, for example, a username and a password. In some examples, alternative or additional credentials, such as digital certificates, personal identification encryption keys, physical or logical tokens, and others can be utilized.

Figure 3:
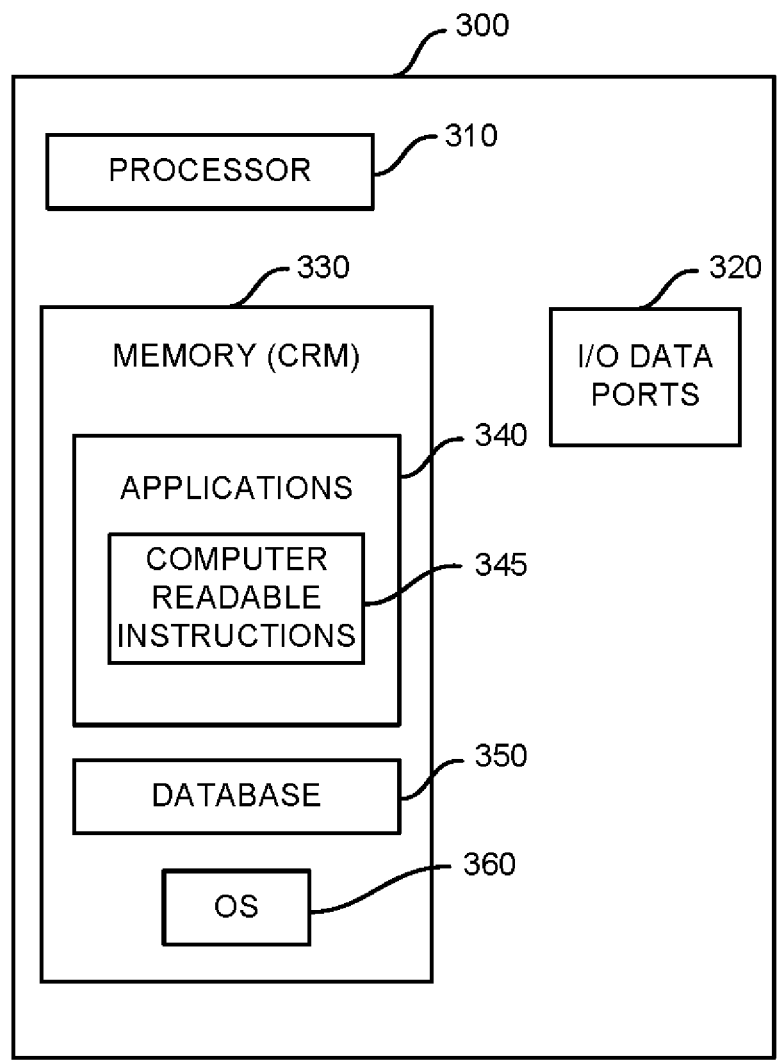
FIG. 3 conceptually illustrates details of a computing device with which the authentication system shown in FIG. 1 may be implemented, according to one or more examples of the disclosure.

In some examples, as shown in FIG. 1, the user authenticator 115 may be a captive portal hosted on a dedicated server or a computing device, such as the computing device 300 shown in FIG. 3. In other examples, the user authenticator 115 may be a captive portal hosted as firmware or on a local device storage (e.g., through an access point or router). In still other examples, the captive portal can be hosted on a non-dedicated server. The user authenticator 115 can communicate via the communication network 140 for authentication purposes but is restricted from greater network access.

The user authenticator 115 determines whether the user credentials are valid by comparing the user credentials against a predefined stored list of valid user credentials. If the user credentials are not valid, the user authenticator 115 may ask the user for additional user credentials or simply stop authentication of the device 105. The user authenticator 115 informs the network access controller 130 as to the validity of the user credentials.

The network access controller 130 may be a server or computing device that controls the physical layer access of the device 105 to the network. According to one example, the network access controller 130 includes a policy manager that determines the access level of the device 105 based on network policies. In another example, the network access controller 130 receives information from a policy manager (not shown) about the access level of the device 105.

As the user authenticator 115 receives the user credentials, the user authenticator 115 also actively collects sensor data from at least one sensor of the device 105. This sensor data is, in turn, collected by a sensor data signature generator 150. The sensor data signature generator 150 generates a sensor data signature that is characteristic of the sensor(s) of the device 105. Due to micro variances between the same sensors of different devices, the raw sensor data from a sensor of one device will be different from the same type of sensor sensing the same condition in another device. Thus, the sensor data signature identifies the device 105 relative to other devices.

Using motion sensor data as an example, the sensor data signature generator 150 collects raw sensor data from motion sensor(s) of the device 105 via the user authenticator 115. The raw motion sensor data may be collected over a time period of, for example, five seconds. The sensor data signature generator 150 computes features, such as standard deviation, mean, average, etc., based on the raw motion sensor data and forms a vector of features. These features are unique to the motion sensor(s) of the device 105. This vector of features is the sensor data signature for the device 105.

The sensor data signature of the device 105 is collected from the sensor data signature generator 150 by a sensor data signature authenticator 110 included in the authentication system 100. Although shown as being distinct from the authentication system 100, the sensor data signature generator 150 may be included as part of the authentication system 100. Additionally, the sensor data signature generator 150 may be implemented on a computing device, such as the computing device 300 shown in FIG. 3.

The sensor data signature authenticator 110 determines whether the sensor data signature of the device corresponds to one of a plurality of recognized sensor data signatures that are stored in advance, e.g., in a memory. The recognized sensor data signatures are respectively characteristic of sensor data collected from respective sensors of respective recognized devices. According to illustrative examples, the recognized sensor data signature data signatures are learned in advance, using a supervised deep learning model. For example, the respective sensor data signatures of a plurality of devices are added to a machine learning model as the devices are authenticated for communication over the network 140.

The sensor data signature authenticator 110 determines whether the sensor data signature of the device 105 corresponds to one of the plurality of recognized sensor data signatures by comparing the sensor data signature of the device 105 to the plurality of recognized sensor data signatures and determining whether the sensor data signature of the device is within a threshold of similarity to one of the plurality of recognized sensor data signatures. This threshold of similarity provides some tolerance for variations in sensor data that are not due to the micro variances between the physical sensors of different devices. The threshold may be tuned as desired.

Responsive to the sensor data signature authenticator 110 determining that the sensor data signature corresponds to one of the plurality of recognized sensor data signatures, the sensor data signature authenticator 110 authenticates the device 105 for communication over the network 140 and instructs the network access controller 130 to allow the device 105 to communicate over the network 140.

Responsive to the sensor data signature authenticator 110 determining that the sensor data signature of the device 105 does not correspond to one of the plurality of recognized sensor data signatures, the sensor data signature authenticator 110 initiates a request for verification of user credentials. This request may be sent via, for example, the network access controller 130 to the user authenticator 115. Alternatively, this request may be sent directly to the user authenticator 115 from the authentication system 100. The user authenticator 115, in turn, requests the user to enter the same user credentials that were originally entered by the user for authentication and/or asking the user to enter secondary or alternative user credentials.

Responsive to verification of the user credentials by the user authenticator 115, the sensor data signature authenticator 110 adds the sensor data signature of the device 105 to the plurality of recognized sensor data signatures. In this manner, the sensor data signature authenticator "learns" a previously unrecognized sensor data signature of the device 105. The sensor data signature authenticator 110 authenticates the device and instructs the network access controller 130 to allow the device to communicate over the network 140. However, if the user credentials are not verified by the user authenticator 115, the sensor data signature authenticator 110 does not authenticate the device 105 and instructs the network access controller 130 not to allow the device 105 to communicate over the network 140.

Referring now to the traffic pattern signature, while the device 105 is connected to the network 140 and attempting authentication to communicate over the network 140, a traffic sniffer 160 passively observes traffic from the device 105, e.g., packets generated by the device 105. The traffic sniffer 160 may be included, for example, in a switch (not shown) in the network 140.

The traffic sniffer 160 passes the observed traffic onto a traffic pattern signature generator 170. The traffic pattern signature generator 170 observes a traffic pattern of the traffic and generates a traffic pattern signature that is characteristic of the traffic pattern and identifies the device 105 based on the observed traffic.

According to an illustrative example, the traffic pattern observed by the traffic pattern signature generator 170 may be an interarrival time (IAT) between packets observed from the device 105 by the traffic sniffer 160. That is, the traffic pattern signature generator 170 computes the interarrival time (IAT) between packets collected from the device 105 by the traffic sniffer 160 over a time period of, for example, two seconds, and generates a traffic pattern signature that is characteristic of the traffic pattern observed from the device 105. Unlike an IP or MAC address, the IAT between packets observed from a device cannot be faked. Thus, the traffic pattern signature generated based on the traffic pattern observed from the device 105 reliably identifies the device 105.

The traffic pattern signature may be generated in the form of a histogram with a percentage number of packets collected over a time period. For example, for five packets being collected over a time period of two seconds, a histogram may be generated that shows the percentage of number of packets collected over the two-second time period. The IAT is highly dependent on physical hardware components of devices, such as clocks, memories, and network drivers. Due to micro variances in these physical components between devices, the IAT for one device will be unique to that device. Thus, the traffic pattern signature generated from the device 105 will uniquely identify the device 105.

The traffic pattern signature is passed from the traffic pattern signature generator 170 to a traffic pattern signature authenticator 120 included in the authentication system 100. Although shown as being distinct from the authentication system 100, the traffic pattern signature generator 170 may be included as part of the authentication system 100 and be implemented on a computing device, such as the computing device 300 shown in FIG. 3.

The traffic pattern signature authenticator 120 determines whether the traffic pattern signature of the device 105 corresponds to one of a plurality of recognized traffic pattern signatures that are stored in advance, e.g., in a memory. The recognized traffic pattern signatures are respectively characteristic of traffic patterns observed from respective recognized devices. According to illustrative examples, the recognized traffic pattern signatures of devices are learned in advance, using a supervised deep learning model. For example, the traffic patterns of devices that are connected to the network 140 are observed over time during a training phase. After the training phase, the traffic pattern signatures are stored as the recognized plurality of traffic pattern signatures. The amount of time required to learn the traffic patterns of the devices may vary from, for example, hours to days, depending on the network and the number of devices connected to the network 140. This training phase may need to be repeated from time to time as new devices are connected to the network 140.

The traffic pattern signature authenticator 120 determines whether the traffic pattern signature of the device 105 corresponds to one of a plurality of recognized traffic pattern signatures that are respectively characteristic of traffic patterns observed from respective recognized devices by comparing the traffic pattern signature of the device 105 to the plurality of recognized traffic pattern signatures and determining whether the traffic pattern signature of the device 105 matches one of the plurality of recognized sensor data signatures. For example, the traffic pattern signature authenticator 120 correlates the traffic pattern signature with the plurality of recognized traffic pattern signatures and provides a score of 0 to 1 for each recognized traffic pattern signature, where 1 represent a perfect match. The traffic pattern signature authenticator 120 repeatedly determines whether the traffic pattern signature of the device 105 corresponds to one of a plurality of recognized traffic pattern signatures over a period of time, such that false negatives may be safely detected and discarded. This period of time, which may be configurable as needed, may be for example, fifteen minutes.

Responsive to the traffic pattern signature authenticator 120 determining that the traffic pattern signature of the device 105 corresponds to one of the plurality of recognized traffic pattern signatures, the traffic pattern signature 120 authenticates the device 105 for communication over the network 140. In the event that the device 105 has already been authenticated, e.g., by the sensor data signature authenticator 110, the traffic pattern signature authenticator 120 confirms the authentication. In either case, the traffic pattern signature authenticator 120 instructs the network access controller 130 to allow the device 105 to access the network 140 for communication.

Responsive to the traffic pattern signature authenticator 120 determining that the traffic pattern signature of the device 105 does not correspond to one of the plurality of recognized traffic pattern signatures, the traffic pattern signature authenticator 120 does not authenticate the device. In the event that the device 105 has already been authenticated, e.g., by the sensor data signature authenticator 110, the traffic pattern signature authenticator 120 revokes authentication responsive to determining that the traffic pattern signature of the device 105 does not correspond to one of the plurality of recognized traffic pattern signatures. In either case, the traffic pattern signature authenticator 120 instructs the network access controller 130 not to allow the device 105 to communicate over the network 140.

The network access controller 130 responds to the instructions from the sensor data signature authenticator 110 and the traffic pattern signature authenticator 120 and determines whether to allow the device 105 to communicate over the network 140 based on these instructions. For example, if the sensor data signature authenticator 110 authenticates the device 105 and instructs the network access controller 130 to allow the device 105 to communicate over the network 140, the network access controller 130 will allow the device 105 to communicate over the network 140 unless the traffic pattern signature authenticator 120 revokes authentication of the device 105 and instructs the network access controller 130 not to allow the device 105 to communicate over the network 140. As another example, if the traffic pattern signature authenticator 120 authenticates the device 105 and instructs the network access controller 130 to allow the device to communicate over the network 140 but the sensor data signature authenticator 110 does not authenticate the device and instructs the network access controller 130 not to allow the device 105 to communicate over the network 140, the network controller 130 does not allow the device to communicate over the network 140. As yet another example, if the traffic pattern signature authenticator 120 authenticates the device 105 and instructs the network access controller 130 to allow the device 105 to communicate over the network 140 but no instructions are received from the sensor data signature authenticator 110, e.g., because the device 105 does not include sensors, the network access controller 130 allows the device to communicate over the network 140.

Once the device 105 is authenticated, the network access controller 130 sends permission to the device 105 to communicate over the network 140. The network access controller 130 may be implemented with a computing device, such as the computing device 300 shown in FIG. 3

After the device 105 is authenticated for communicating over the network 140, the traffic pattern signature authenticator 120 continually determines whether the traffic pattern signature of the device 105 corresponds to one of the plurality of recognized traffic pattern signatures and either confirms or revokes authentication of the device 105 based on the determination. This allows for zero-touch continuous authentication of the device 105 without requiring additional user input.

The authentication system 100, including the sensor data signature authenticator 110 and the traffic pattern signature authenticator 120 may be implemented in one or more computing devices, such as the computing device 300 shown in FIG. 3 and described below.

Although the authentication system 100 described above includes a sensor data signature authenticator 110 and a traffic pattern signature authenticator 120, either or both of the sensor data signature authenticator 110 and the traffic pattern signature authenticator 120 may be used to authenticate the device 105 for communication over the network. For example, as indicated above, for a device 105 that does not include a sensor from which sensor data may be collected, authentication may be provided only by the traffic pattern signature authenticator 120. Authentication by both the sensor data signature authenticator 110 and the traffic pattern signature authenticator 120 provides increased confidence as to the identity of the device 105.

Figure 2A:
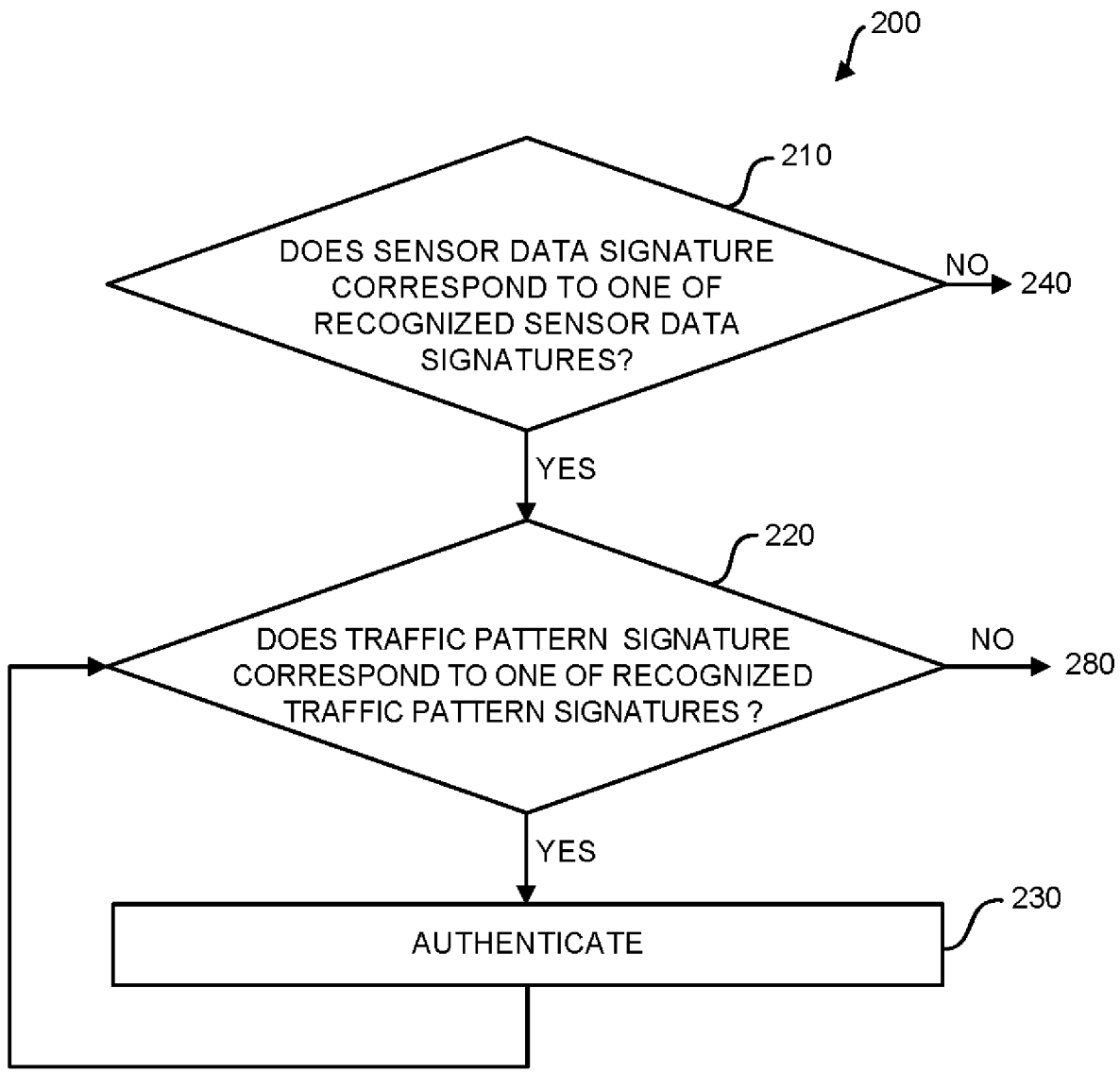
FIGS. 2A-2C are flowcharts depicting a method for authenticating a device for communication over a network, according to one or more examples of the disclosure.

FIG. 2A is a flowchart depicting a method 200 for authenticating a device for communication over a network according to one or more examples of the disclosure. The method 200 includes determining at 210 whether the sensor data signature that is characteristic of sensor data collected from a sensor of the device corresponds to one of a plurality of recognized sensor data signatures that are respectively characteristic of sensor data collected from respective sensors of respective recognized devices. This determination may be made by the sensor data signature authenticator 110 shown in FIG. 1. In addition, or as an alternative, the method also includes determining at 220 whether a traffic pattern signature of the device that is characteristic of a traffic pattern observed from the device corresponds to one of a plurality of recognized traffic pattern signatures that are respectively characteristic of traffic patterns observed from respective recognized devices. This determination may be made by the traffic pattern signature authenticator 120 shown in FIG. 1. While either determination 210 or 220 is effective for authenticating the device, performing both provides for increased confidence as to the identity of the device.

Responsive to determining that the sensor data signature corresponds to one of the plurality of recognized sensor data signatures and/or the traffic pattern signature of the device corresponds to one of the plurality of recognized traffic pattern signatures, the device is authenticated at 230. As shown in FIG. 2A, after the device is authenticated, a determination is repeatedly made at 220 whether the traffic pattern signature of the device corresponds to one of the plurality of recognized traffic pattern signatures. This provides for continuous authentication.

Figure 2B:
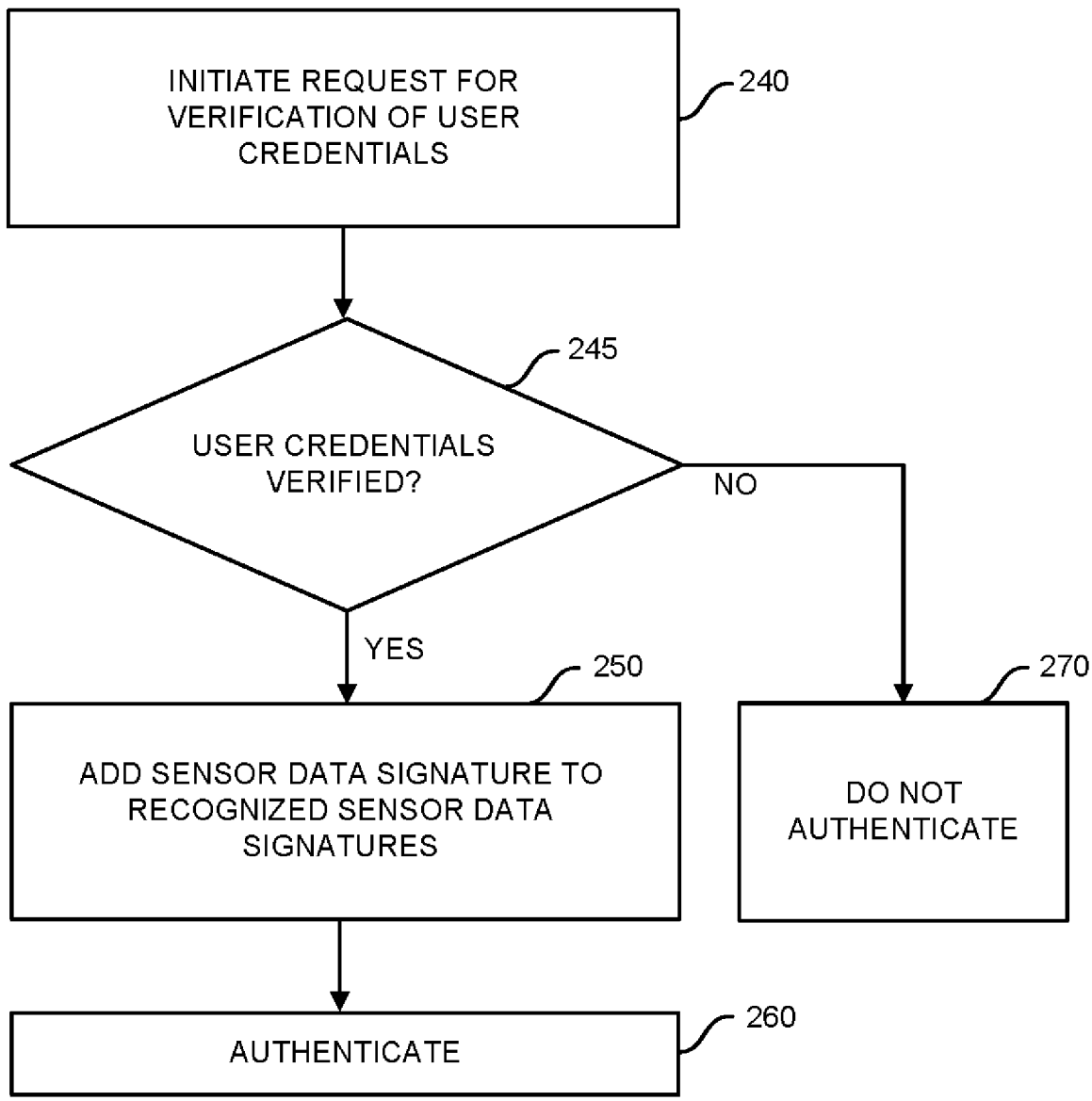

Responsive to determining that the sensor data signature of the device does not correspond to one of the plurality of recognized sensor data signatures at 210, the method 200 proceeds to initiating a request for verification of user credentials at 240 as shown in FIG. 2B. The request may be initiated by the sensor data signature authenticator 110 and sent to the user authenticator 115 for verification as shown in FIG. 1 and described above. Responsive to verification of the user credentials at 245, the sensor data signature of the device is added to the plurality of recognized sensor data signatures at 250. At 260, the device is authenticated for communication over the network. Responsive to the user credentials not being verified at 245, the device is not authenticated at 270.

Figure 2C:
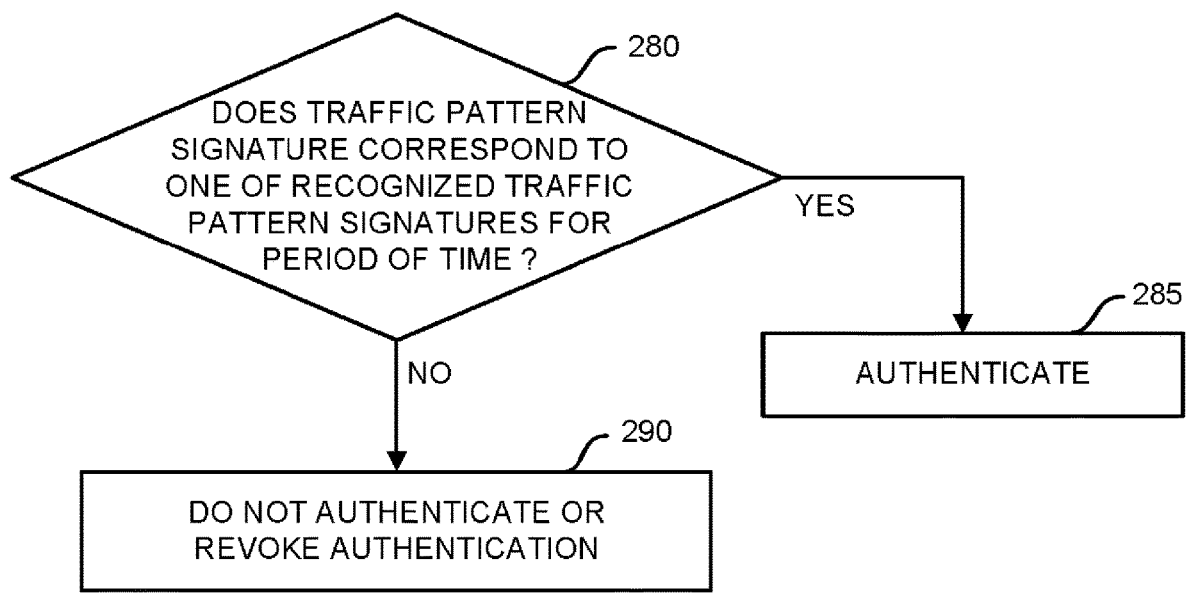

Referring now to FIG. 2A, responsive to determining that the traffic pattern signature of the device does not correspond to one of the plurality of recognized traffic pattern signatures at 220, the method 200 proceeds, as illustrated in FIG. 2C, to determining whether the traffic pattern signature of the device corresponds to one of the plurality of recognized traffic pattern signatures for a period of time at 280. This may involve repeatedly whether the traffic pattern signature of the device corresponds to one of the plurality of recognized traffic pattern signatures until the period of time expires. Responsive to determining that the traffic pattern nature of the device corresponds to one of the plurality of recognized traffic pattern signatures for the period of time, the device is authenticated at 285. Responsive to determining that the traffic pattern signature of the device does not correspond to one of the plurality of recognized traffic pattern signatures for the period of time, the device is not authenticated at 290. If the device was previously authenticated by, for example, the sensor data signature authenticator 110 shown in FIG. 1, the device authentication is revoked at 290.

FIG. 3 is a block diagram of a computing device 300 with which the authentication system 100, the user authenticator 115, and/or the network access controller 130 may be implemented, according to illustrative examples. The sensor data signature authenticator 110 and the traffic pattern signature authenticator 120 of the authentication system 100 may be included in the same or different computing devices. The sensor data signature generator 150 and the traffic pattern signature generator 170 may also be implemented with a computing device such as that shown in FIG. 3. Although no connections are shown between the components illustrated in FIG. 3, those skilled in the art will appreciate that the components can interact with each other via any suitable connections to carry out device functions.

The term "application", or variants thereof, is used expansively herein to include routines, program modules, program, components, data structures, algorithms, and the like. Applications can be implemented on various system configurations, including single-processor or multiprocessor systems, minicomputers, mainframe computers, personal computers, microprocessor-based, programmable consumer electronics, combinations thereof, and the like. The terminology "computer-readable medium" and variants thereof, as used in the specification and claims, includes non-transitory storage media. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium that can be used to store information that can be accessed.

Referring to FIG. 3 with continued reference to FIG. 1, the computing device 300 may be implemented in, for example, a server connected to the network 140. The computing device 300 includes a processor 310 that receives inputs and transmits outputs via I/O Data Ports 320. The I/O Data Ports 320 can be implemented with, e.g., any suitable interface through which data and signals may be received and transmitted wired and/or wirelessly. For example, for the authentication system 100, the inputs may include sensor data signatures and traffic pattern signatures, and the outputs may include instructions to initiate verification of user credentials, authenticate, not authenticate, confirm authentication, and revoke authentication.

Although not shown, the computing device 300 may also include a physical hard drive. The processor 310 communicates with memory 330 and the hard drive via, e.g., an address/data bus (not shown). The processor 310 can be any commercially available or custom microprocessor. The memory 330 is representative of the overall hierarchy of memory devices containing the software and data used to implement the functionality of the computing device 300. The memory 330 can include, but is not limited to, the types of memory devices described above, including a non-transitory computer readable medium (CRM). As shown in FIG. 3, the memory 330 may include several categories of software and data used in the computing device 300, including applications 340, a database 350, an operating system (OS) 360, etc.

The applications 340 can be stored in the memory 330 and/or in a firmware (not shown) and can include computer readable instructions 345 that can be executed by the processor 310. The applications 340 include various programs that implement the various features of the device 300. For example, the applications 340 may include applications to implement the functions of the authentication system 100 (including determining whether the sensor data signature of the device 105 corresponds to one of a plurality of recognized sensor data signature, determining whether the traffic pattern signature of the device 105 corresponds to one of a plurality of recognized traffic pattern signatures, learning the plurality of recognized sensor data signature and the plurality of recognized traffic pattern signatures, etc.).

The database 350 represents the static and dynamic data used by the applications 340, the OS 360, and other software programs that may reside in the memory. The database 350 may be used to store various data including data needed to execute the applications 340, e.g., the plurality of recognized sensor data signatures and the plurality of recognized traffic pattern signatures.

While the memory 330 is illustrated as residing proximate the processor 310, it should be understood that at least a portion of the memory 330 can be a remotely accessed storage system, for example, a server on a communication network, a remote hard disk drive, a removable storage medium, combinations thereof, and the like.

It should be understood that FIG. 3 and description above are intended to provide a brief, general description of a suitable environment in which the various aspect of some examples of the present disclosure can be implemented. While the description includes a general context of computer-executable instructions, the present disclosure can also be implemented in combination with other program modules and/or as a combination of hardware and software in addition to, or instead of, computer readable instructions. For example, the authentication system 100 could be implemented in whole or in part on specialized hardware, for example in a field-programmable gate array in order to achieve faster computation times.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A non-transitory computer readable medium comprising computer executable instructions stored thereon that, when executed by a processor, cause the processor to:
   determine a sensor data signature of a device connected to a network, wherein determining the sensor data signature comprises:
      collecting data provided by a sensor of the device over time to form a set of collected data, wherein the sensor is associated with capturing a physical phenomena, and the data represents the physical phenomena;
      determining one or multiple statistics characterizing one or multiple numerical measures of the set of collected data; and
      determining the sensor data signature based on the one or multiple statistics;
   determine a traffic pattern signature of the device based on an inter-arrival time (IAT) between packets observed from the device;
   determine whether the sensor data signature of the device corresponds to a given recognized sensor data signature of a plurality of recognized sensor data signatures;
   determine whether the traffic pattern signature of the device corresponds to a given recognized traffic pattern signature of a plurality of recognized traffic pattern signatures; and
   authenticate the device for communication over the network responsive to determining that the sensor data signature of the device corresponds to the given recognized sensor data signature and the traffic pattern signature of the device corresponds to the given recognized traffic pattern signature.

2. The non-transitory computer readable medium of claim 1, further comprising instructions that, when executed by the processor, cause the processor to determine whether the traffic pattern signature of the device corresponds to the given recognized traffic pattern signature while the device is connected to the network.

3. The non-transitory computer readable medium of claim 2, further comprising instructions that, when executed by the processor, cause the processor to revoke authentication of the device responsive to determining that the traffic pattern signature of the device does not correspond to any recognized traffic pattern signature of the plurality of recognized traffic pattern signatures.

4. The non-transitory computer readable medium of claim 1, further comprising instructions that, when executed by the processor, cause the processor to initiate a request for verification of user credentials responsive to determining that the sensor data signature of the device does not correspond to any recognized sensor data signature of the plurality of recognized sensor data signatures.

5. The non-transitory computer readable medium of claim 4, further comprising instructions that, when executed by the processor, cause the processor to add the sensor data signature of the device to the plurality of recognized sensor data signatures and authenticate the device for communicating over the network responsive to verification of the user credentials.

6. The non-transitory computer readable medium of claim 1, further comprising instructions that, when executed by the processor, cause the processor to determine whether the traffic pattern signature corresponds to a recognized traffic pattern signature of the plurality of recognized traffic pattern signatures over a predetermined period of time.

7. An authentication system comprising:
  a sensor data signature authenticator to:
    determine a sensor data signature of a device connected to a network, wherein determining the sensor data signature comprises:
      collecting data provided by a sensor of the device over time to form a set of collected data, wherein the sensor is associated with capturing a physical phenomena, and the data represents the physical phenomena;
      determining one or multiple statistics characterizing one or multiple numerical measures of the set of collected data; and
      determining the sensor data signature based on the one or multiple statistics; and
    authenticate the device for communication over the network responsive to determining that the sensor data signature corresponds to a given recognized sensor data signature of the plurality of recognized sensor data signatures; and
  a traffic pattern signature authenticator to:
    determine a traffic pattern signature of the device based on an inter-arrival time (IAT) between packets observed from the device; and
    confirm authentication of the device for communication over the network responsive to determining that the traffic pattern signature of the device corresponds to a given recognized traffic pattern signature of the plurality of recognized traffic pattern signatures.

8. The authentication system of claim 7, wherein the sensor data signature authenticator is to initiate a request for verification of user credentials responsive to determining that the sensor data signature of the device does not correspond to any recognized sensor data signature of the plurality of recognized sensor data signatures.

9. The authentication system of claim 8, wherein the sensor data signature authenticator is to add the sensor data signature of the device to the plurality of recognized sensor data signatures responsive to verification of the user credentials.

10. The authentication system of claim 7, wherein the plurality of recognized sensor data signatures is to be learned by the sensor data authenticator based on the sensor data collected from respective sensors of respective recognized devices.

11. The authentication system of claim 7, wherein the plurality of recognized traffic pattern signatures is to be learned by the traffic pattern signature authenticator based on traffic patterns observed from respective recognized devices.

12. The authentication system of claim 7, wherein the traffic pattern signature authenticator is to repeatedly determine whether the traffic pattern signature of the device corresponds to a recognized traffic pattern signature of the plurality of recognized traffic pattern signatures while the device is connected to the network.

13. The authentication system of claim 12, wherein the traffic pattern signature authenticator is to revoke the authentication of the device responsive to repeatedly determining for a period of time that the traffic pattern signature of the device does not correspond to any recognized traffic pattern signature of the plurality of recognized traffic pattern signatures.

* * * * *